US009781284B2

(12) United States Patent
Hozono (10) Patent No.: US 9,781,284 B2
(45) Date of Patent: Oct. 3, 2017

(54) IMAGE READING DEVICE INCLUDING READING UNIT COUPLED WITH FLAT CABLE

(71) Applicant: KYOCERA Document Solutions Inc., Osaka-shi, Osaka (JP)

(72) Inventor: Tomohide Hozono, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/163,578

(22) Filed: May 24, 2016

(65) Prior Publication Data

US 2016/0352927 A1 Dec. 1, 2016

(30) Foreign Application Priority Data

May 25, 2015 (JP) .................. 2015-105169

(51) Int. Cl.
*H04N 1/04* (2006.01)
*H04N 1/00* (2006.01)

(52) U.S. Cl.
CPC ....... *H04N 1/0083* (2013.01); *H04N 1/00559* (2013.01); *H04N 1/04* (2013.01); *H04N 2201/0094* (2013.01)

(58) Field of Classification Search
CPC .... H04N 1/0083; H04N 1/00559; H04N 1/04; H04N 2201/0094
USPC ........ 358/497, 494, 474, 505; 250/234–236; 174/117 FF, 99 R
See application file for complete search history.

(56) References Cited

U.S. PATENT DOCUMENTS

| | | | | |
|---|---|---|---|---|
| 6,840,795 B1* | 1/2005 | Takeda | .................. | H01R 13/562 439/445 |
| 6,953,898 B2* | 10/2005 | Chen | ........................ | B41J 19/20 174/100 |
| 7,428,081 B2* | 9/2008 | Yamauchi | ............ | H04N 1/0083 250/208.1 |
| 7,969,621 B2* | 6/2011 | Shunji | ................ | H04N 1/00519 271/109 |
| 8,339,686 B2* | 12/2012 | Liu | ....................... | H04N 1/0083 358/474 |
| 8,547,604 B2* | 10/2013 | Kozaki | .............. | H04N 1/00559 271/10.03 |
| 8,810,870 B2* | 8/2014 | Wei | .................... | H04N 1/00557 358/474 |

(Continued)

FOREIGN PATENT DOCUMENTS

JP 2004348074 A 12/2004

*Primary Examiner* — Cheukfan Lee
(74) *Attorney, Agent, or Firm* — Alleman Hall Creasman & Tuttle LLP (57) ABSTRACT

An image reading device includes a housing, a reading unit, a flat cable, and a support member. The reading unit is movably provided in the housing and configured to reciprocally move from a start position to an end position in a reading range. One end of the flat cable is coupled with the reading unit and a predetermined portion thereof on the other end side is fixed to the housing. The flat cable is stored in a bent state in the housing. The support member is provided in the reading unit and configured to support the flat cable and displace, in response to a movement position of the reading unit, a support point of the flat cable in an up-down direction with respect to a coupling portion coupling the one end of the flat cable with the reading unit.

9 Claims, 9 Drawing Sheets

(56) References Cited

U.S. PATENT DOCUMENTS

| | | | |
|---|---|---|---|
| 9,013,766 B2* | 4/2015 | Yamasaki | H04N 1/00522 |
| | | | 358/474 |
| 9,049,327 B2* | 6/2015 | Xu | H04N 1/0083 |
| 9,369,601 B2* | 6/2016 | Matsumoto | H04N 1/0249 |
| 9,538,030 B2* | 1/2017 | Xie | H04N 1/00525 |
| 2001/0040705 A1* | 11/2001 | Yokota | H04N 1/0083 |
| | | | 358/474 |
| 2006/0033775 A1* | 2/2006 | Tsai | B41J 19/00 |
| | | | 347/50 |
| 2008/0068679 A1* | 3/2008 | Murai | H04N 1/00519 |
| | | | 358/497 |
| 2008/0316547 A1* | 12/2008 | Kim | H04N 1/0083 |
| | | | 358/474 |
| 2012/0026558 A1* | 2/2012 | Fujiwara | H04N 1/0083 |
| | | | 358/474 |
| 2013/0250373 A1* | 9/2013 | Takeuchi | H04N 1/0285 |
| | | | 358/474 |
| 2015/0331381 A1* | 11/2015 | Kobayashi | H04N 1/00 |
| | | | 358/1.13 |
| 2016/0316073 A1* | 10/2016 | Tsujihara | H04N 1/0083 |

* cited by examiner

IMAGE READING DEVICE INCLUDING READING UNIT COUPLED WITH FLAT CABLE

INCORPORATION BY REFERENCE

This application is based upon and claims the benefit of priority from the corresponding Japanese Patent Application No. 2015-105169 filed on May 25, 2015, the entire contents of which are incorporated herein by reference.

BACKGROUND

The present disclosure relates to an image reading device that includes a reading unit coupled with a flat cable.

An image reading device includes a reading unit that includes: a reading sensor such as a CIS in which a plurality of imaging elements are arranged in a main scanning direction; a light-emitting element, such as an LED, configured to emit light to an imaging target; and optical components such as a lens and a mirror. The image reading device has a transparent, flat plate-like contact member, wherein a document sheet, from which an image is to be read, is placed on an upper surface of the contact member. The reading unit is configured to be reciprocally moved along the back surface of the contact member in a housing of the image reading device. The reading unit reads an image from a document sheet by, while moving, irradiating light toward the back surface of the contact member and receiving reflection light thereof. A flexible-type flat cable (hereinafter referred to as "FFC") is connected to the reading unit, and control signals and data are communicated between the reading unit and a control portion via the FFC.

Since the reading unit reciprocally moves in the housing as described above, the FFC is stored in the housing in a bent state forming the shape of letter U in a cross section so that it can follow the movement of the reading unit. When the reading unit moves, the FFC expands and contracts following the movement of the reading unit, while keeping the bent state. The FFC has a repulsive force (restoring force) against the bending, and thus, when the reading unit moves to a position distanced from a bending part of the FFC, the bending part becomes large due to the repulsive force and the bending part may contact the back surface of the contact member. In connection with this, if the housing is made tall to accommodate the maximum size of the bending part, the size of the housing in the height direction becomes large. There are known some configurations conceived for the problem to be solved. For example, there is known a configuration where the reading unit is provided with a pressing portion for separating the FFC from the contact member. In addition, there is known a configuration where the FFC extends out diagonally downward from a connection portion between the reading unit and the FFC.

SUMMARY

An image reading device according to an aspect of the present disclosure includes a housing, a reading unit, a flat cable, and a support member. The reading unit is movably provided in the housing and configured to reciprocally move from a start position to an end position in a reading range. One end of the flat cable is coupled with the reading unit and a predetermined portion thereof on the other end side is fixed to the housing. The flat cable is stored in a bent state in the housing. The support member is provided in the reading unit and configured to support the flat cable and displace, in response to a movement position of the reading unit, a support point of the flat cable in an up-down direction with respect to a coupling portion coupling the one end of the flat cable with the reading unit.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the drawings. It should be noted that the following embodiment is an example of a specific embodiment of the present disclosure and should not limit the technical scope of the present disclosure.

Figure 1:
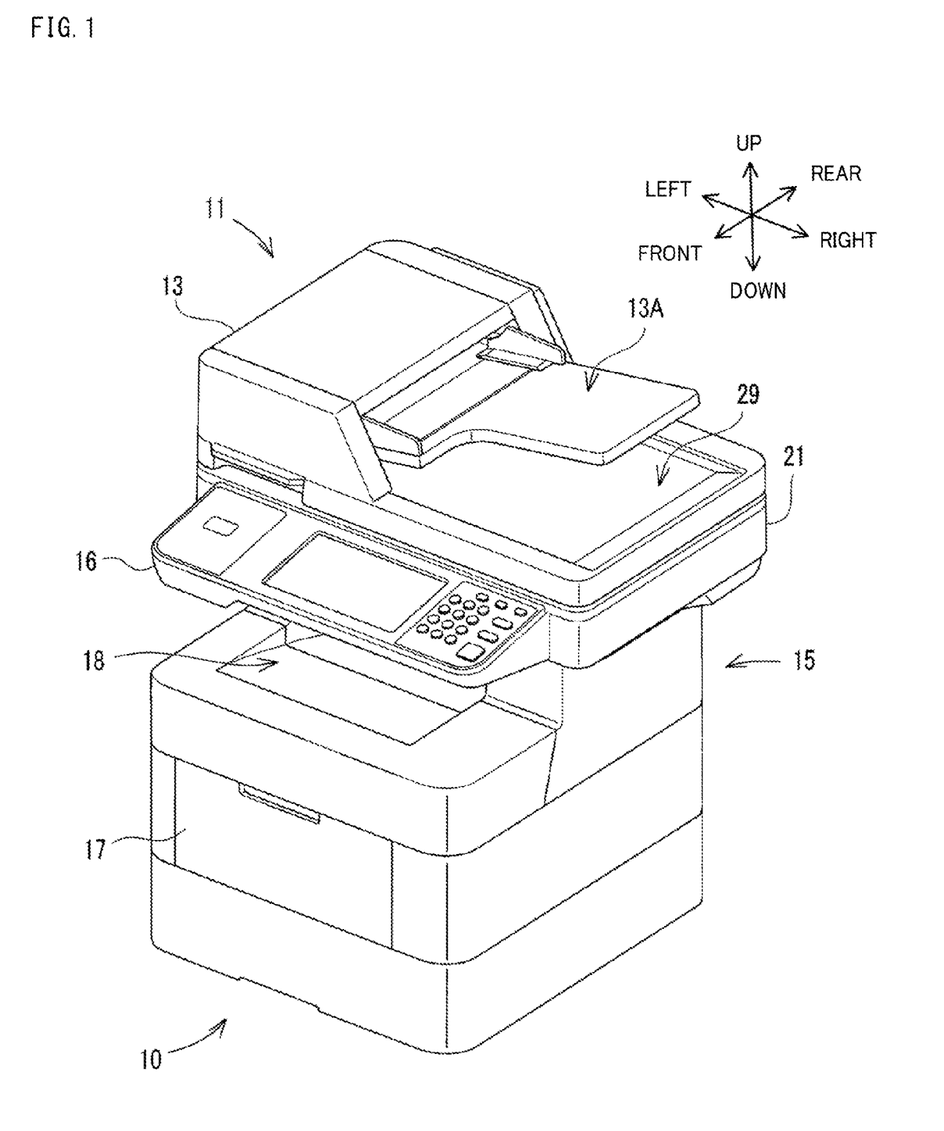
FIG. 1 is a perspective view of an image forming apparatus including an image reading device according to an embodiment of the present disclosure.

Outlined configurations of an image reading device 11 according to an embodiment of the present disclosure and an image forming apparatus 10 including the same are described with reference to FIG. 1 to FIG. 3. It is noted that FIG. 3 shows a state where an upper-part of a housing 21 of the image reading device 11 has been removed.

The image forming apparatus 10 is a multifunction peripheral having a plurality of functions such as an image reading function, a facsimile function, and an image forming function. As shown in FIG. 1, the image forming apparatus 10 includes the image reading device 11, an automatic document feeder 13 (hereinafter referred to as an ADF 13), an electrophotographic image forming portion 15, an operation/display portion 16, a sheet feed cassette 17, and a sheet discharge portion 18. It is noted that although the present embodiment describes the image forming apparatus 10 including the image reading device 11 as one example, the present disclosure is not limited to this.

The image reading device 11 is attached to an upper part of the image forming apparatus 10. The ADF 13 is provided in the image reading device 11. The image reading device 11 reads image data from a document sheet. As shown in FIG. 2, the image reading device 11 includes a reading unit 22, a contact member 27, a contact member 28, a document sheet pressing 29, and a housing 21. Some of the components are stored in the housing 21.

The contact member 27 and the contact member 28 are both attached to an upper part of the housing 21. The contact member 27, on which a document sheet, an image-reading target, is placed, is held horizontally by the housing 21. The contact member 28 transmits light emitted from the reading unit 22 so that the light is irradiated on a document sheet conveyed by the ADF 13, and is held horizontally by the housing 21. The contact members 27 and 28 are each formed in the shape of a flat plate, and made of a transparent material (for example, glass or transparent resin).

The contact member 28 is an elongated member extending in a main scanning direction (the front-rear direction in FIG. 1), and is a transparent member formed in a shape of a plate. In addition, the width of the contact member 28 is narrow in a sub scanning direction (a direction perpendicular to the main scanning direction).

Figure 2:
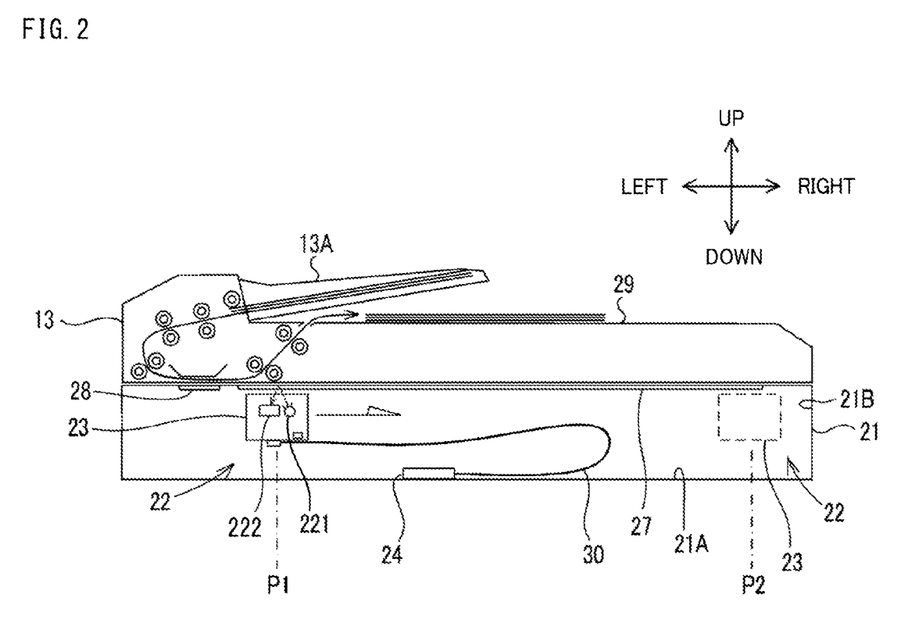
FIG. 2 is a diagram showing an inner configuration of the image reading device.
Figure 3:
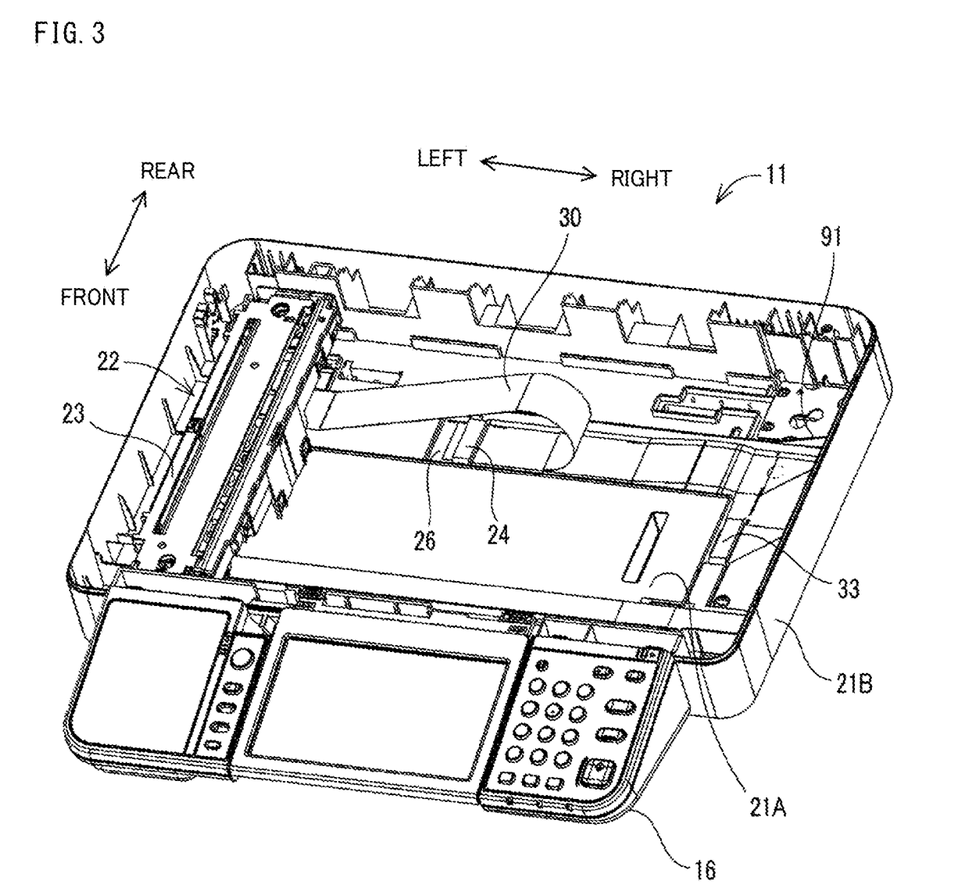
FIG. 3 is a perspective view showing an inner configuration of a housing of the image reading device.

As shown in FIG. 2, the reading unit 22 is a device for reading an image from a document sheet conveyed by the ADF 13, or from a document sheet placed on the contact member 28. The reading unit 22 includes a light source 221 and an imaging element 222. These optical members are stored in a carriage 23 that constitutes a main frame of the reading unit 22.

The carriage 23 of the reading unit 22 is configured to be reciprocally moved in the left-right direction by a well-known moving mechanism that uses a drive device such as a stepping motor. In the present embodiment, the carriage 23 is configured to be reciprocally moved from a start position P1 to an end position P2 during an operation to read an image from a document sheet placed on the contact member 27. This makes it possible for the reading unit 22 to move reciprocally between the start position P1 and the end position P2. Here, the start position P1 is below a left-end position of the document sheet placed on the contact member 27. In addition, the end position P2 (a position represented by a dotted line in FIG. 2) is distanced from the start position P1 rightward by a maximum reading range. In the present embodiment, the end position P2 is set in the vicinity of a right-side wall 21B of the housing 21.

The moving mechanism may be, for example, a belt transmission mechanism or a gear transmission mechanism that is configured to transmit a driving force from the motor to the carriage 23. In the image reading device 11, in the state where a document sheet is placed on the contact member 27 and the document sheet pressing 29 is closed, the reading unit 22 is reciprocally moved in the left-right direction below the document sheet, in the housing 21 by the drive device. While the reading unit 22 is moving rightward, light irradiated from the light source 221 toward the contact member 27 is scanned, and reflection light thereof is received by the imaging element 222. In this way, the image of the document sheet is read.

A flexible flat cable (FFC) 30 is provided in the housing 21. The FFC 30 electrically connects the reading unit 22 to the control portion, and is composed of conducting wires covered with insulating resin. An end of the FFC 30 is electrically connected to the reading unit 22. Specifically, a connector 32 (see FIG. 4) is attached to an end of the FFC 30, and the connector 32 is coupled with a connection portion 63 (an example of the coupling portion of the present disclosure, see FIG. 4) of a control board 62 of the reading unit 22.

A fixing portion 24 for fixing the FFC 30 is provided on a bottom surface 21A of the housing 21. Specifically, the fixing portion 24 is provided on a bottom portion of a wide groove 26 (see FIG. 3) which is formed in the bottom surface 21A to extend in the left-right direction. As shown in FIG. 3, the groove 26 extends, in the bottom surface 21A, linearly from near the center to the right in the left-right direction, bends at right angle at the right-side wall 21B, and extends linearly to the front along the inner surface of the right-side wall 21B. A part of the FFC 30 that extends from the fixing portion 24 to connect to the control portion is stored in the groove 26 in the state of creeping on the bottom portion thereof, being bent as necessary and reaching a connector 33 provided on the front side. The connector 33 electrically connects, directly or via another cable, the other end of the FFC 30 to the control portion.

In the present embodiment, the fixing portion 24 fixes the FFC 30 to the bottom surface 21A in the state where a part of the FFC 30 extending from the fixing portion 24 to the reading unit 22 is bent. That is, an end of the FFC 30 is coupled with the reading unit 22 via the connector 32, and a predetermined portion on the other end side of the FFC 30 is fixed to the bottom surface 21A by the fixing portion 24. The other end of the FFC 30 is connected to the control portion via the connector 33. With this configuration, the FFC 30 is stored in the housing 21 in the state where a part thereof extending from the fixing portion 24 to the reading unit 22 is bent, such that the FFC 30 can follow the reciprocal movement of the carriage 23.

Figure 9A:
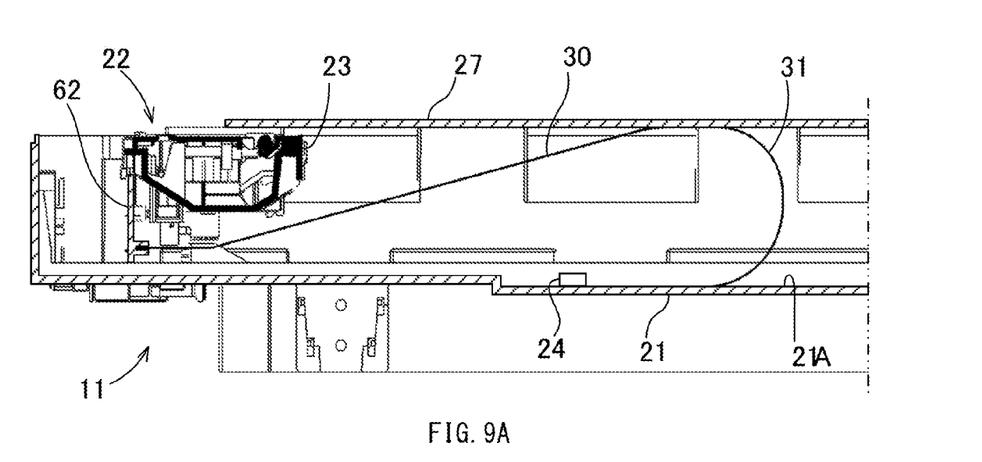
FIG. 9A and FIG. 9B are cross-sectional views showing an image reading device that does not include the swaying support portion.
Figure 9B:
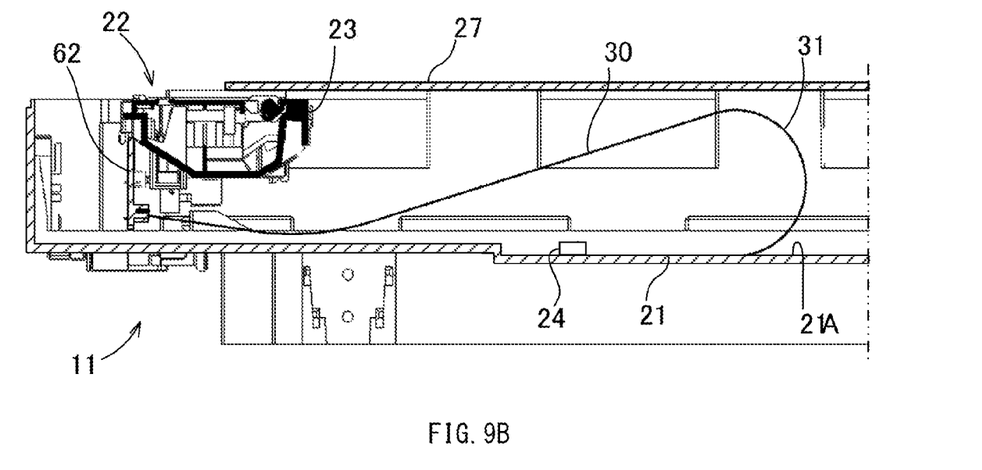

Meanwhile, as shown in FIG. 9A, if the FFC 30 is extending horizontally from the reading unit 22 when the reading unit 22 is at the start position P1, a bending part 31 of the FFC 30 may become large in bending diameter due to the restoring force and contact the contact member 27. On the other hand, as shown in FIG. 9B, if the FFC 30 is pressed down so as to extend downward from the reading unit 22, the bending diameter of the bending part 31 does not become excessively large and the bending part 31 is prevented from contacting the contact member 27. However, if the reading unit 22 moves to the end position P2 (see FIG. 2) while the FFC 30 is pressed down, the bending diameter of the bending part 31 becomes too small at the end position P2, and an excessive load is applied to the FFC 30. As a result, the FFC 30 may be broken, and in some cases, the conducting wires therein may be disconnected. In the present embodiment, a swaying support portion 80 that is described below is provided in the reading unit 22. This prevents the contact member 27 from contacting the FFC 30, and prevents an excessive bending of the bending part 31 of the FFC 30 at the end position P2.

In the following, a coupling mechanism of the FFC 30 in the reading unit 22 is explained with reference to FIG. 4 to FIG. 8.

Figure 4:
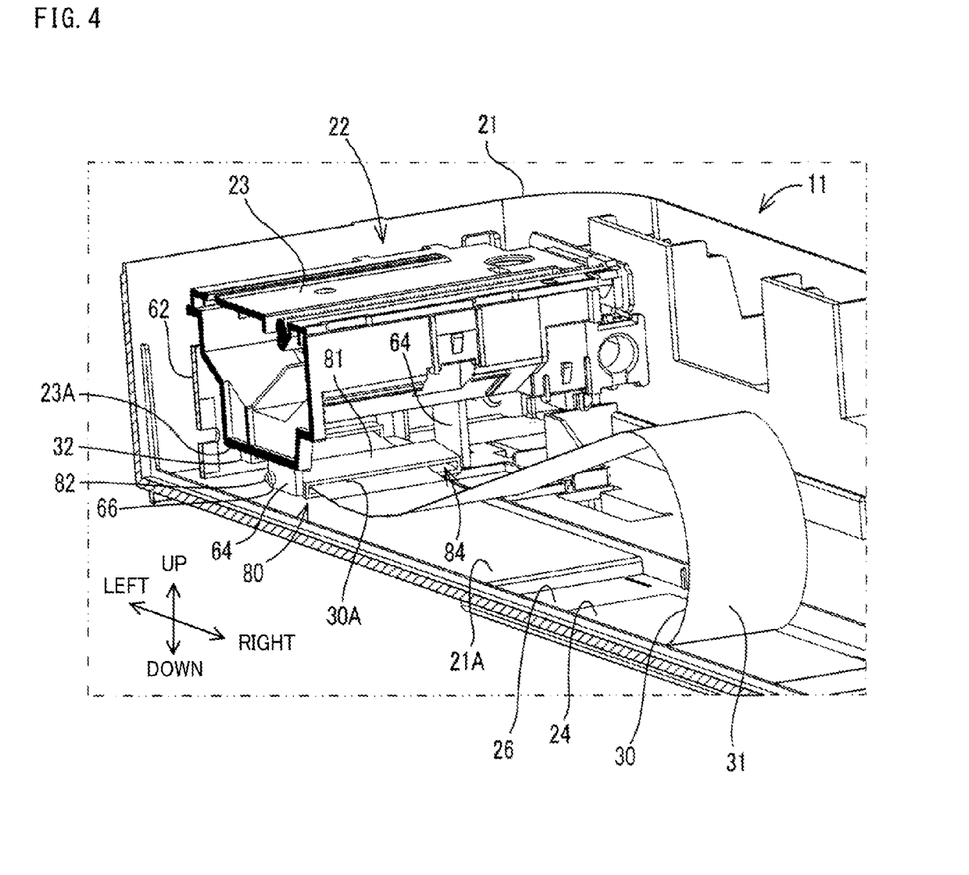
FIG. 4 is a perspective view showing a swaying support portion included in a reading unit of the image reading device.
Figure 5:
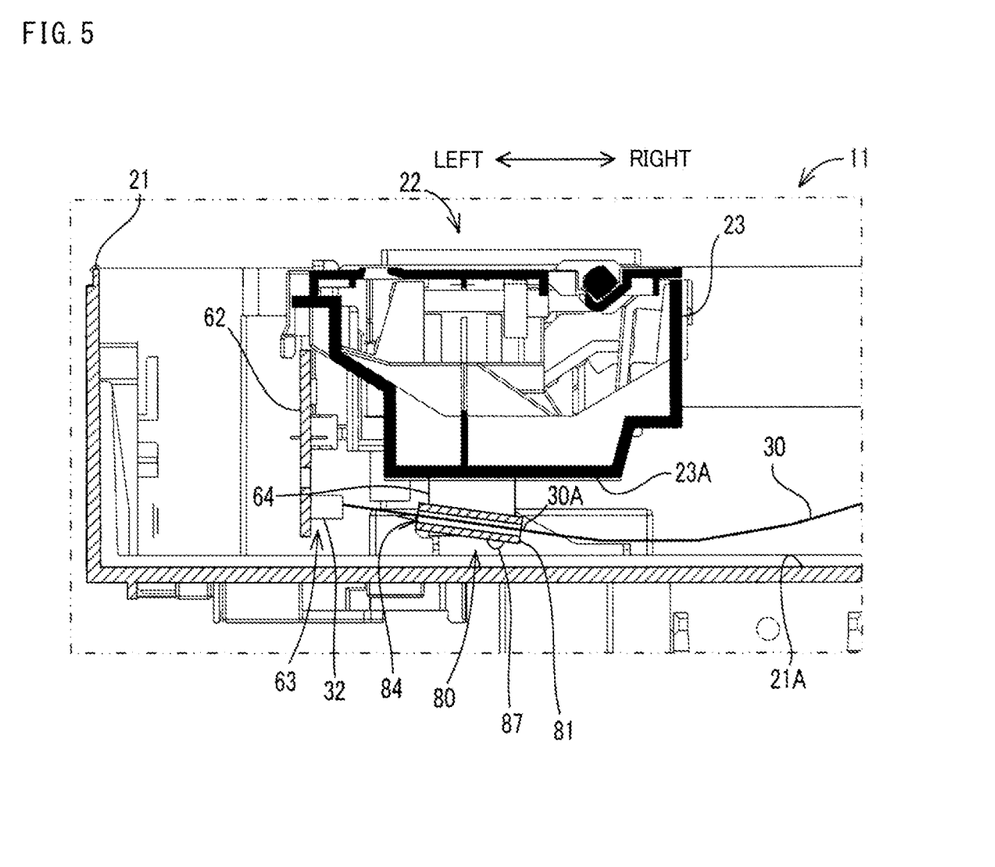
FIG. 5 is a cross-sectional view showing a peripheral mechanism of the reading unit located at a start position in a reading range.

As shown in FIG. 4 and FIG. 5, the control board 62 for controlling the light source 221 and the imaging element 222 is attached to the carriage 23. The control board 62 is fixed to the left side of the carriage 23 via a bracket or the like. The control board 62 is formed in the shape of a flat plate and is disposed to face the left side surface of the carriage 23. The lower end of the control board 62 is lower in position than a bottom surface 23A of the carriage 23.

A connection portion 63 is provided on a lower portion of a surface of the control board 62 facing to the right. The connector 32 attached to an end of the FFC 30 is connected to the connection portion 63 so that the FFC 30 is electrically connected to the control board 62.

A pair of support plates 64 are provided on the bottom surface 23A of the carriage 23, wherein the support plates 64 are separated from each other in the front-rear direction. The support plates 64 project downward from the bottom surface 23A. Shaft holes 66 are respectively formed in left-end portions of the support plates 64. Support shafts 82 of the swaying support portion 80 are supported by the shaft holes 66 such that the swaying support portion 80 can sway, wherein the support shafts 82 are described below.

The swaying support portion 80 (an example of the support member of the present disclosure) is provided in the reading unit 22. Specifically, the swaying support portion 80 is attached to the support plates 64 below the bottom surface 23A of the carriage 23. The swaying support portion 80 supports the FFC 30, and displaces, in the up-down direction, a supported portion 30A (the support point) of the FFC 30 in response to a movement position of the reading unit 22. In the present embodiment, the swaying support portion 80 supports the FFC 30 such that the supported portion 30A of the FFC 30 can sway in the up-down direction.

Specifically, the swaying support portion 80 includes an insertion portion 81 and a shaft 82, wherein the insertion portion 81 supports the FFC 30 in the state where the FFC 30 is inserted therein. The insertion portion 81 is formed in the shape of a flat rectangular parallelepiped, and a pass-through hole 84 is formed to penetrate the insertion portion 81 from a surface to another opposite surface thereof. The FFC 30 is inserted in the pass-through hole 84. The support shafts 82 are provided on opposite side surfaces of the insertion portion 81 in the front-rear direction. The support shafts 82 are provided on the connection portion 63 side (left side) of the opposite side surfaces. The support shafts 82 are respectively inserted in the shaft holes 66 of the support plates 64. As such, the swaying support portion 80 is supported by the carriage 23 such that the right end portion of the insertion portion 81 can sway around the support shafts 82 in the up-down direction.

An abutting portion 87 is provided on a back surface (the lower surface) of the insertion portion 81, wherein the abutting portion 87 is configured to abut on an inclined portion 91 that is described below. The abutting portion 87 is provided on a rear-right portion of the back surface of the insertion portion 81. The abutting portion 87 is formed in an arc shape so as to reduce a contact resistance with the inclined portion 91. In addition, the abutting portion 87 is formed in the shape of a semi-cylinder extending in the front-rear direction so as to secure a contact area with the inclined portion 91.

Figure 6:
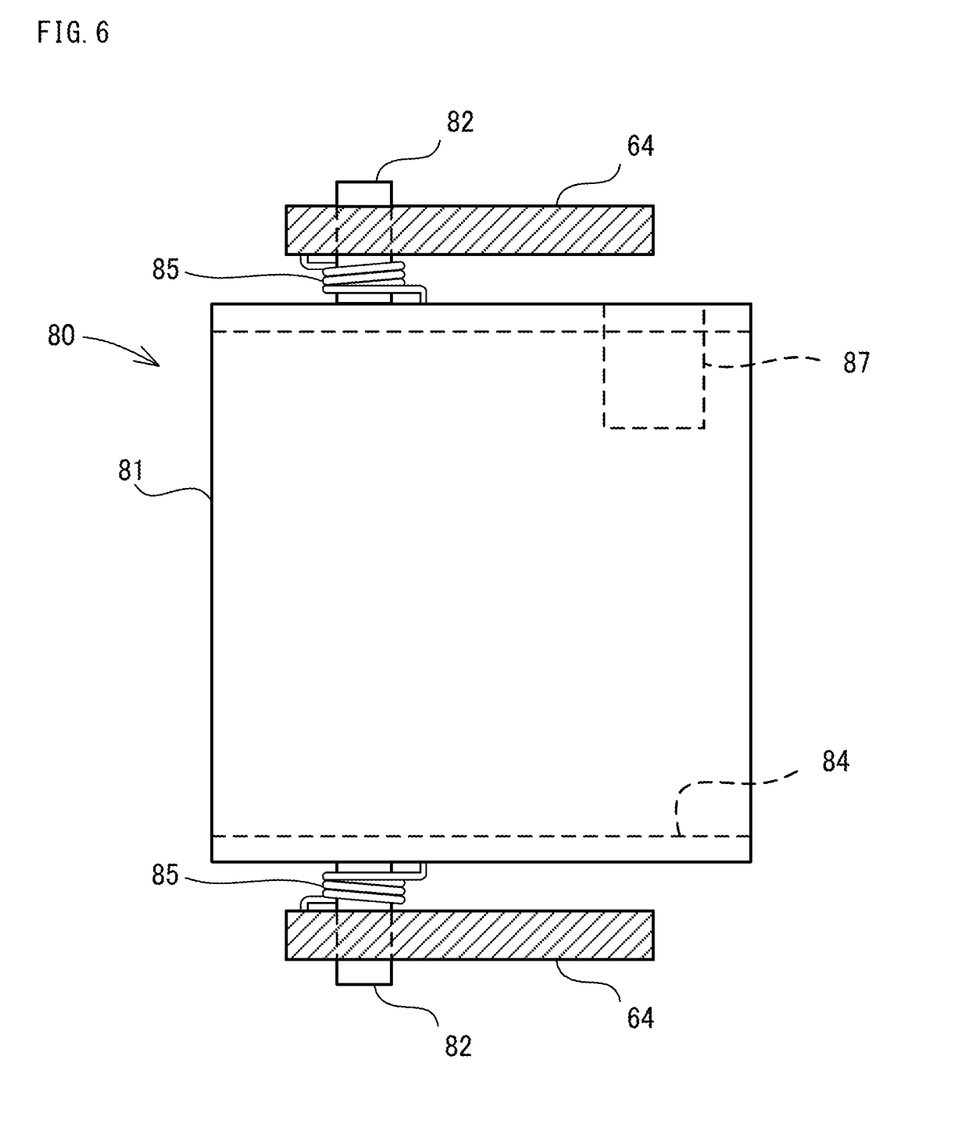
FIG. 6 is a top view of the swaying support portion of the reading unit.

As shown in FIG. 6, a torsion coil spring 85 (an example of the first biasing member of the present disclosure) is attached to each of the support shafts 82. The torsion coil springs 85 elastically bias the right-end portion of the insertion portion 81 of the swaying support portion 80 downward. With this configuration, in the state where no other outer force is applied, upon receiving the spring force (biasing force) of the torsion coil spring 85, the right-end portion of the insertion portion 81 of the swaying support portion 80 is oriented downward, which allows the supported portion 30A of the FFC 30 to be lower in position than the connection portion 63. It is noted that the torsion coil spring 85 may be replaced with any other biasing member as far as it can bias the right-end portion of the insertion portion 81 downward.

With the provision of the swaying support portion 80, when the reading unit 22 is at any position other than the end position P2, the FFC 30 is oriented downward. With this configuration, the supported portion 30A is pressed down to a position lower than the connection portion 63 such that the FFC 30 extends diagonally downward from the reading unit 22, thereby preventing the bending diameter of the bending part 31 from becoming excessively large. As a result, the contact member 27 and the FFC 30 are prevented from contacting each other.

Figure 7:
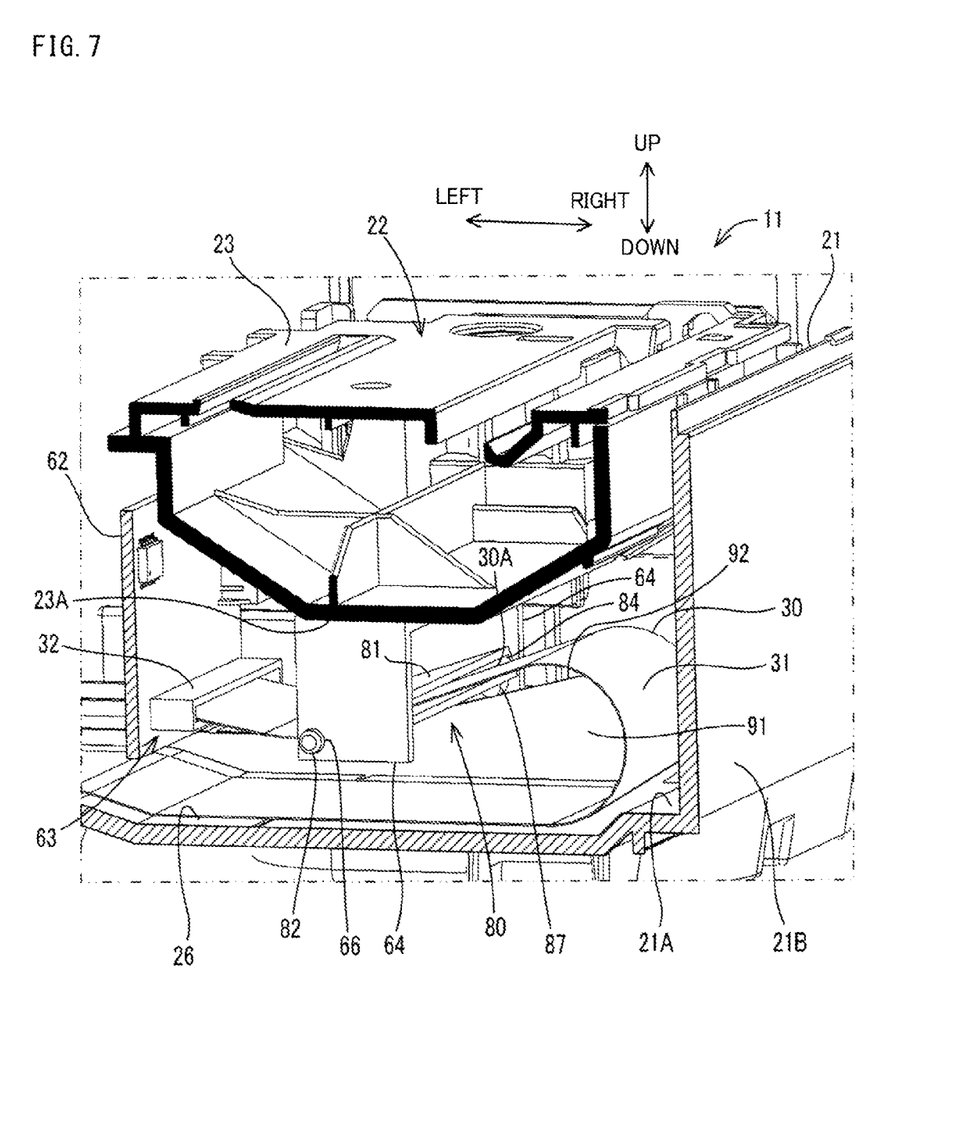
FIG. 7 is a perspective view showing a peripheral mechanism of the reading unit located at an end position in the reading range.
Figure 8:
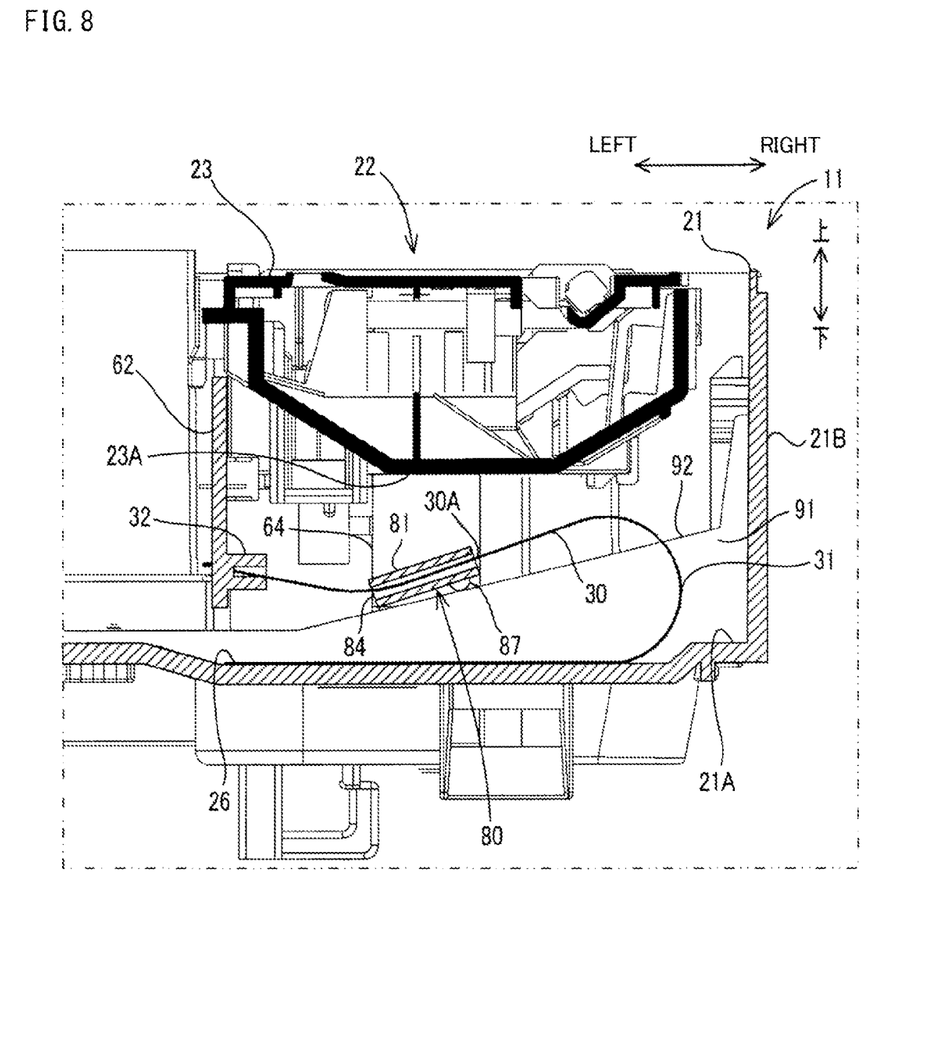
FIG. 8 is a cross-sectional view showing the peripheral mechanism of the reading unit located at the end position in the reading range.

In addition, as shown in FIG. 7 and FIG. 8, the housing 21 includes the inclined portion 91 (an example of the second biasing member of the present disclosure). The inclined portion 91 is formed on a right-end portion of the bottom surface 21A. As the reading unit 22 moves toward the end position P2, the inclined portion 91 biases the insertion portion 81 of the swaying support portion 80 upward against the spring force of the torsion coil springs 85.

Specifically, the inclined portion 91 is provided on a right-end portion (an end portion on the end position P2 side) of the bottom surface 21A. The inclined portion 91 is a rib-like member projecting from the bottom surface 21A upward along a side surface on the rear side of the groove 26. The inclined portion 91 is linearly inclined from the flat surface of the bottom surface 21A diagonally upward to the right. The inclined portion 91 is provided at a position to abut on a lower end of the insertion portion 81 of the swaying support portion 80, namely, at a position to abut on the abutting portion 87 provided on the back surface of the insertion portion 81. Specifically, an inclined edge 92 (an example of the inclined surface of the present disclosure), namely an upper surface of the inclined portion 91 abuts on the abutting portion 87. That is, the inclined portion 91 is provided on the end position P2 side of the bottom surface 21A, and includes the inclined edge 92 that is diagonally inclined upward from the bottom surface 21A toward the end position P2.

Since the inclined portion 91 is provided as described above, when the reading unit 22 approaches the end position P2, the abutting portion 87 abuts on the inclined edge 92. When the reading unit 22 further moves toward the end position P2, the abutting portion 87 is pressed upward by the inclined edge 92. This allows the insertion portion 81 of the swaying support portion 80 to be swayed upward around the support shafts 82. When the reading unit 22 reaches the end position P2, as shown in FIG. 8, the right-end of the insertion portion 81 is higher in position than the support shafts 82 and the connection portion 63. In other words, upon receiving a pressing force from the inclined edge 92, the right-end of the insertion portion 81 of the swaying support portion 80 is oriented upward, which allows the supported portion 30A to be higher in position than the connection portion 63. As the reading unit 22 moves from the start position P1 toward the end position P2, the bending part 31 and the bending diameter become smaller. However, after the reading unit 22 approaches the end position P2 and the abutting portion 87 abuts on the inclined edge 92, the bending diameter gradually becomes large. With this configuration, the bending diameter of the bending part 31 does not become excessively small at the end position P2, and an excessive bending of the bending part 31 can be prevented. As a result, an excessive load is not applied to the FFC 30, and a disconnection or a bending distortion of the FFC 30 is prevented.

It is noted that in the above-described embodiment, the swaying support portion 80 includes the pass-through hole 84 that extends in the left-right direction. However, the present disclosure is not limited to this configuration. For example, the present disclosure is applicable to a configuration where the FFC 30 is inserted in an annular member composed of a wire or the like, and the inclined edge 92 causes the annular member to be displaced in the up-down direction with respect to the connection portion 63, in response to the position of the reading unit 22. Furthermore, in the above-described embodiment, the inclined edge 92 that applies an upward biasing force to the swaying support portion 80 is formed in a linear shape. However, it suffices that the angle and the shape of the inclined edge 92 are set so that the size of the bending part 31 does not reach an allowable maximum size of the bending part 31 while the reading unit 22 moves to the end position P2. Furthermore, in place of the inclined edge 92, an inclined surface may be formed on an upper end of the inclined portion 91 at the same inclination angle as the inclined edge 92.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
    a housing;
    a reading unit movably provided in the housing and configured to reciprocally move from a start position to an end position in a reading range;
    a flat cable whose one end is coupled with the reading unit and whose predetermined portion on a side of another end is fixed to the housing, the flat cable being stored in a bent state in the housing;
    a support member provided in the reading unit and configured to support the flat cable and displace, in response to a movement position of the reading unit, a support point of the flat cable in an up-down direction with respect to a coupling portion coupling the one end of the flat cable with the reading unit;
    a first biasing member configured to bias the support member downward; and
    a second biasing member configured to bias the support member upward against a biasing force of the first biasing member in response to the reading unit moving toward the end position.

2. The image reading device according to claim 1, wherein
    upon receiving the biasing force of the first biasing member, the support member allows the support point to be lower in position than the coupling portion, and upon receiving a biasing force of the second biasing member, the support member allows the support point to be higher in position than the coupling portion.

3. The image reading device according to claim 1, wherein
    the second biasing member is provided on an end position side of a bottom surface of the housing so as to abut on a lower end of the support member, and includes an inclined surface that is diagonally inclined upward from the bottom surface toward the end position.

4. The image reading device according to claim 3, wherein
    the support member includes, on a lower end thereof, an abutting portion that is configured to abut on the inclined surface at the end position, and
    the abutting portion is formed in an arc shape so as to reduce a contact resistance with the inclined surface.

5. The image reading device according to claim 3, wherein
    a groove extending in a moving direction of the reading unit is formed on the bottom surface of the housing,
    the flat cable is stored in a bottom portion of the groove, and
    the second biasing member is a rib-like member that projects upward from a bottom surface of the groove along one of opposite side surfaces of the groove that face each other in a main scanning direction perpendicular to a moving direction of the reading unit, and the inclined surface is formed on an upper end of the rib-like member.

6. The image reading device according to claim 1, wherein
    the support member supports the flat cable such that the support point can sway in the up-down direction.

7. An image reading device comprising:
    a housing;
    a reading unit movably provided in the housing and configured to reciprocally move from a start position to an end position in a reading range;
    a flat cable whose one end is coupled with the reading unit and whose predetermined portion on a side of another end is fixed to the housing, the flat cable being stored in a bent state in the housing; and
    a support member provided in the reading unit and configured to support the flat cable and displace, in response to a movement position of the reading unit, a support point of the flat cable in an up-down direction with respect to a coupling portion coupling the one end of the flat cable with the reading unit, wherein
    the support member supports the flat cable such that the support point can sway in the up-down direction, and
    the support member includes:
        an insertion portion configured to support the flat cable in a state where the flat cable is inserted therein; and
        a support shaft provided on a coupling portion side in the insertion portion and supported by the reading unit such that the support member can sway.

8. The image reading device according to claim 7, wherein
    the reading unit includes a pair of support plates that project downward from a bottom surface of the reading unit and are separated from each other in a main scanning direction that is perpendicular to a moving direction of the reading unit.

9. The image reading device according to claim 8, wherein
    the support shaft is provided on each of opposite side surfaces of the insertion portion in the main scanning direction, and provided on the coupling portion side in each of the opposite side surfaces.

* * * * *